May 12, 1925.

E. I. LA CHAPELLE

SHOE SOLE MOLD

Filed July 29, 1924

1,537,684

Inventor.

Euclid I. La Chapelle

Patented May 12, 1925.

1,537,684

UNITED STATES PATENT OFFICE.

EUCLID I. LA CHAPELLE, OF BROCKTON, MASSACHUSETTS.

SHOE-SOLE MOLD.

Application filed July 29, 1924. Serial No. 728,854.

*To all whom it may concern:*

Be it known that I, EUCLID I. LA CHAPELLE, a citizen of the United States, residing at Brockton, in the county of Plymouth and Commonwealth of Massachusetts, have invented certain Improvements in Shoe-Sole Molds, of which the following description, in connection with the accompanying drawings, is a specification.

My invention is adaptable to a half-sole mold as well as to a full sole mold and the term "sole," occurring in the specification and in the claims, is to be interpreted so as to include the term "half-sole" in the form of a tap.

My invention relates to certain improvements in shoe sole molds and more particularly to molds for use in molding rubber and rubber composition material on a bevel at the forepart plane surface portion of a boot or shoe sole. A mold for such a purpose being shown in my patent of the United States for improvements in methods of preparing outersoles for boots and shoes, issued June 10, 1924 and bearing No. 1,497,103, and it is not my intention to claim anything already disclosed in that patent.

Experiments have demonstrated that a rubber or rubber composition material that had been formed into a sole embodying a bevel raised portion, such as shown in my aforesaid patent, could be advantageously intersected at its bevel raised portion, and it is one of the objectives of my present invention to provide, in a mold having a bevel shaped depression, a plurality of recess forming elements, preferably in the form of ribs, as herein shown, to thereby form recesses in the bevel raised portion of a molded sole.

Experiments have demonstrated, however, that a sole which had been formed in a mold having a bevel shaped depression and ribs transversely disposed therein to form grooves in the bevel raised portion of the molded sole, would cause serious trouble at the outersole stitching machine in that the presser-foot of the machine often times would engage within the grooves and thus retard or stop the feed movement and cause serious damage to the soles and undue breakage of needles; and it is a further objective of my present invention to eliminate this very serious objection at outersole stitching machines by positioning the recess forming elements in the bevel shaped depression of the mold a substantial distance inwardly of the outer wall portion of the bevel shaped depression so as to cause thereby formation in the molded sole of a continuous edge of the bevel projection.

Figure 1:
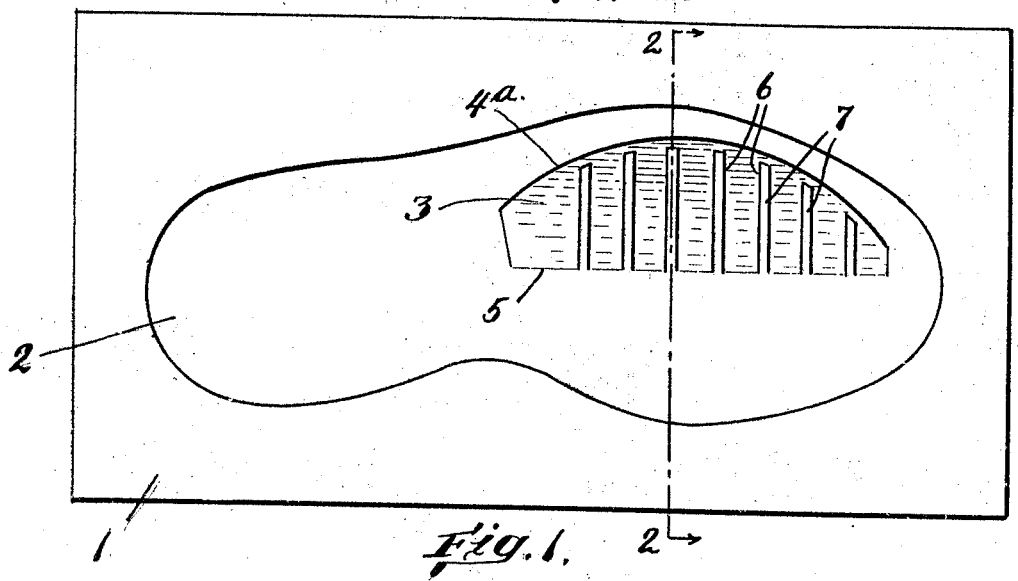
Fig. 1, is a plan view of my improved shoe sole mold.
Figure 2:
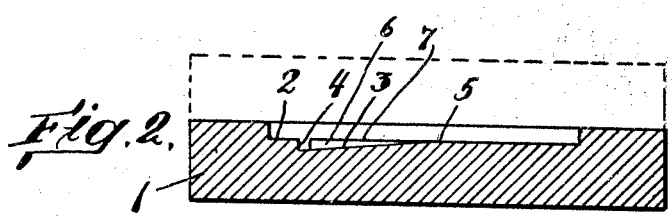
Fig. 2, is a cross-section view of the said mold taken on dotted line 2—2 of Fig. 1.
Figure 3:
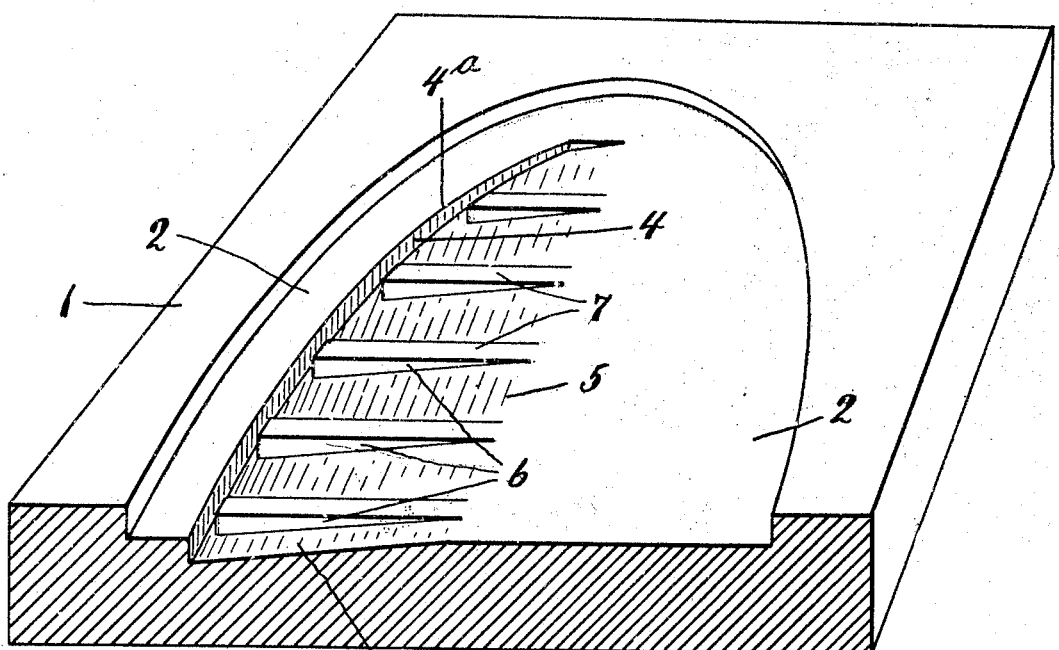
Fig. 3, is an enlarged perspective detail view of the said mold.

As further shown in the drawings, 1, represents a mold-block, the said block having the usual depression 2, which is of a depth, shape and size common to molds for use in molding rubber and rubber composition soles, and 3, represents a bevel shaped depression located at the little toe side plane surface of the forepart of said mold and extending substantially from the toe to the ball with the outer wall 4, of the said bevel shaped depression formed substantially on the arc of a circle, as shown at $4^a$, to accommodate the greatest number of different style shoes, and is shown as positioned a substantial distance from the wall of the usual depression 2, so as to form thereby an extension edge adapted to receive the fastenings, and from its outer wall 4, the said bevel shaped depression terminates at the middle longitudinal line of the forepart, as shown at 5. Transversely of the said bevel shaped depression, a plurality of novel recess forming elements, herein shown as ribs 6, are provided, said ribs terminating slightly inward of the outer wall 4, of the bevel shaped depression 3, and, as shown, the top surface 7, of the ribs 6, is on a parallel line to the plane surface of the usual depression 2, of the mold.

The utmost depth of the bevel shaped depression along its outer wall 4, should be in practice about three sixteenths of an inch.

More specifically explained, the advantages of the recesses, notably in the form of grooves, as herein shown, reside in that the flexibility of the sole forepart is thereby made uniform; the tendency of slipping on wet pavements is thereby appreciably lessened; and, incidentally, recesses form a desirable design on the bevel raised portion of a sole or tap.

It is to be appreciated that, although my present invention relates to improvements on the mold shown in my aforesaid patent, it is not limited to be used in conjunction with the practice of the novel method explained and claimed therein. For instance, I would consider my present invention as availed of in molding rubber soles, even if the molding process or method only involved the pouring of the rubber, for example, in latex state, into a mold as herein shown.

Having thus explained my invention and described the same in the best form now known to me, I claim and desire to secure by Letters Patent of the United States protection for all the novelty herein disclosed to which I am entitled under the statutes and the following claiming clauses are to be interpreted broadly to give effect to this intention:

1. A shoe sole mold, having, in combination, a bevel shaped depression at one of its lateral sides, and a plurality of recess forming elements, positioned relatively to the said bevel shaped depression.

2. A shoe sole mold, having, in combination, a bevel shaped depression at one of its lateral sides, and a plurality of recess forming elements, positioned a substantial distance inwardly of the outer wall portion of the said bevel shaped depression.

3. A shoe sole mold, having, in combination, a bevel shaped depression at one of its lateral sides, and a plurality of elements, positioned relatively to the said bevel shaped depression and adapted to form an irregular surface of the bevel raised portion of a molded sole.

4. A shoe sole mold, having, in combination, a bevel shaped depression at one of its lateral sides, and a plurality of elements, positioned a substantial distance inwardly of the outer wall portion of the said bevel shaped depression and adapted to form an irregular surface of the bevel raised portion of a molded sole.

5. A shoe sole mold, having, in combination, a bevel shaped depression at one of its lateral sides, extending substantially from the toe to the ball and from the edge of the sole depression to the middle longitudinal line of the forepart, and a plurality of recess forming elements, positioned relatively to the said bevel shaped depression.

6. A shoe sole mold, having, in combination, a bevel shaped depression at one of its lateral sides, and a plurality of elements, in the form of ribs, positioned transversely of the said bevel shaped depression.

7. A shoe sole mold, having, in combination, a bevel shaped depression at one of its lateral sides, and a plurality of elements, in the form of ribs, positioned relatively to the said bevel shaped depression.

8. A shoe sole mold, having, in combination, a bevel shaped depression at one of its lateral sides, and a plurality of elements, in the form of ribs, positioned transversely of the said bevel shaped depression and a substantial distance inwardly of the outer wall portion of the said bevel shaped depression.

In testimony whereof I have signed my name to this specification.

EUCLID I. LA CHAPELLE.